United States Patent
Epaud et al.

(10) Patent No.: US 7,100,984 B2
(45) Date of Patent: Sep. 5, 2006

(54) FOLD-DOWN SEAT AND A VEHICLE INCLUDING SUCH A SEAT

(75) Inventors: David Epaud, Morsang sur Orge (FR); François Fourrey, Corquilleroy (FR); Fabrice Lesbats, Sucy en Brie (FR); Christian Couasnon, Malsherbes (FR)

(73) Assignee: Faurecia Sieges d'Automobile S.A., Nan Terre (FR)

( * ) Notice: Subject to any disclaimer, the term of this patent is extended or adjusted under 35 U.S.C. 154(b) by 0 days.

(21) Appl. No.: 10/767,163

(22) Filed: Jan. 28, 2004

(65) Prior Publication Data

US 2004/0212237 A1 Oct. 28, 2004

(30) Foreign Application Priority Data

Feb. 19, 2003 (FR) .................. 03 02009

(51) Int. Cl.
*B60N 2/00* (2006.01)
(52) U.S. Cl. ............... 297/341; 297/378.12
(58) Field of Classification Search ....... 297/341, 297/378.12, 15, 331; 296/65.01, 65.15, 65.09, 296/65.05
See application file for complete search history.

(56) References Cited

U.S. PATENT DOCUMENTS

| | | | | |
|---|---|---|---|---|
| 3,982,787 | A | | 9/1976 | Moll .................. 297/317 |
| 5,482,349 | A | * | 1/1996 | Richter et al. .......... 297/15 |
| 5,941,602 | A | | 8/1999 | Sturt et al. ............ 297/340 |
| 5,979,964 | A | | 11/1999 | Ban et al. ............... 296/66 |
| 6,048,030 | A | * | 4/2000 | Kanda et al. .......... 297/341 |
| 6,099,072 | A | | 8/2000 | Sturt et al. ............. 297/15 |
| 6,123,380 | A | | 9/2000 | Sturt et al. .......... 296/65.09 |
| 6,152,533 | A | | 11/2000 | Smuk ................... 297/341 |
| 6,347,834 | B1 | | 2/2002 | Couasnon .............. 297/341 |
| 2003/0209932 | A1 | | 11/2003 | Brush et al. ........... 297/378.1 |
| 2004/0056521 | A1 | | 3/2004 | Kayumi et al. .......... 297/334 |

FOREIGN PATENT DOCUMENTS

| | | |
|---|---|---|
| DE | 100 55 432 | 5/2001 |
| DE | 199 62 424 C1 | 8/2001 |
| DE | 201 14 059 U1 | 2/2003 |
| DE | 101 49 858 | 4/2003 |
| EP | 1 131 106 | 9/2001 |
| EP | 1 361 106 | 11/2003 |
| EP | 1 400 394 | 3/2004 |
| FR | 2 257 457 | 9/1976 |
| FR | 2 575 708 | 7/1986 |
| JP | 2004106739 | 4/2004 |

OTHER PUBLICATIONS

FR 0302009 International Search Report dated Oct. 15, 2003.
German Office Action dated Apr. 6, 2005, Appl. No. 10 2004 008 177.8 and translation of pp. 2-3 of action (4 pages).

* cited by examiner

*Primary Examiner*—Milton Nelson, Jr.
(74) *Attorney, Agent, or Firm*—McCracken & Frank LLP

(57) ABSTRACT

A vehicle seat comprising a runner made up of a fixed rail fixed to a vehicle floor, and of a moving rail mounted to slide relative to the fixed rail, a front leg having a top end and a bottom end mounted to pivot relative to the vehicle floor, a seat back mounted to pivot relative to the moving rail of the runner, and a seat proper having a front end mounted to pivot on the top end of the front leg. The seat back is mounted to pivot relative to the seat proper, and the seat further comprises at least one locking device adapted to selectively preventing the seat back from pivoting or allowing said seat back to pivot.

14 Claims, 7 Drawing Sheets

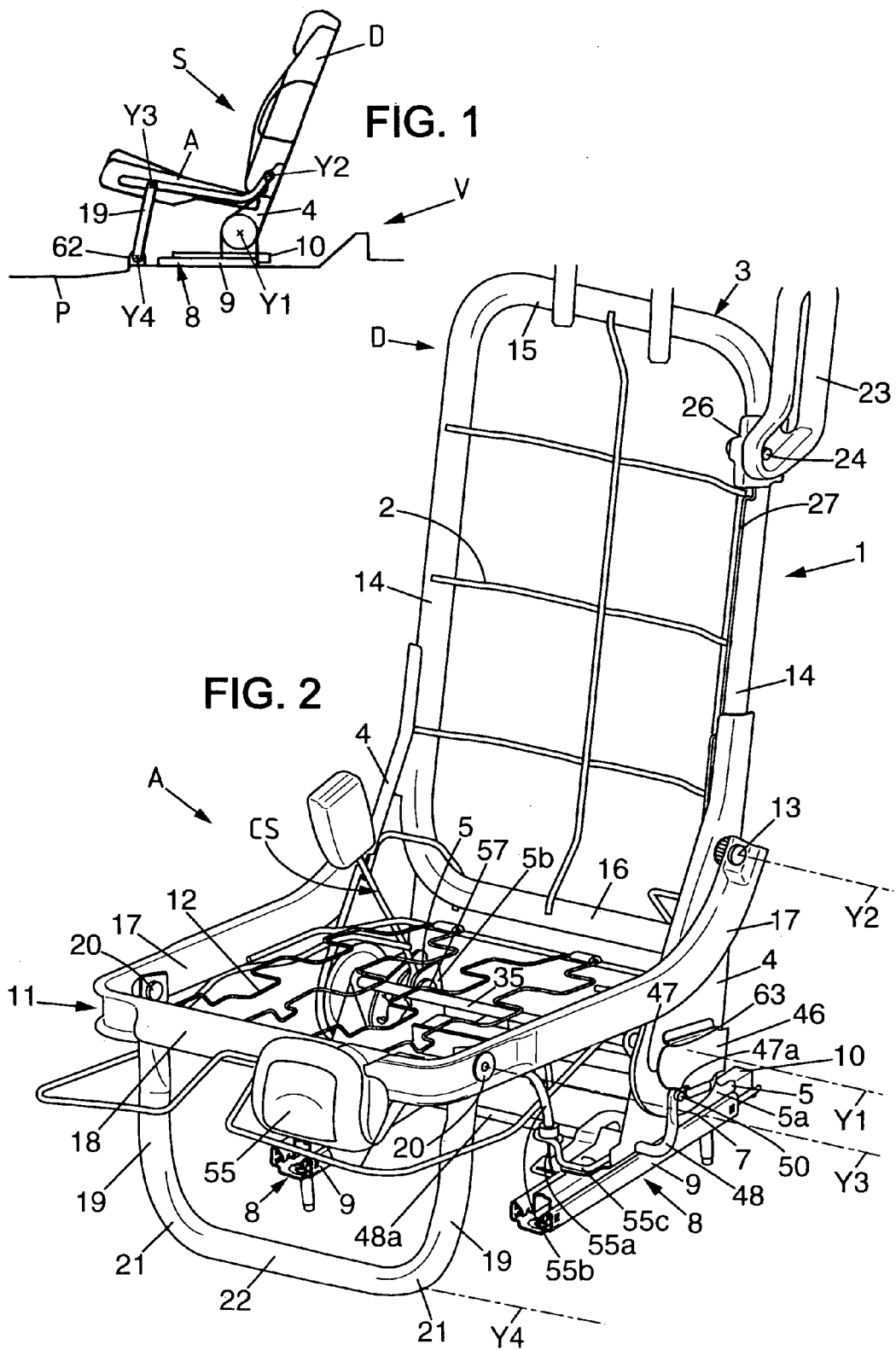

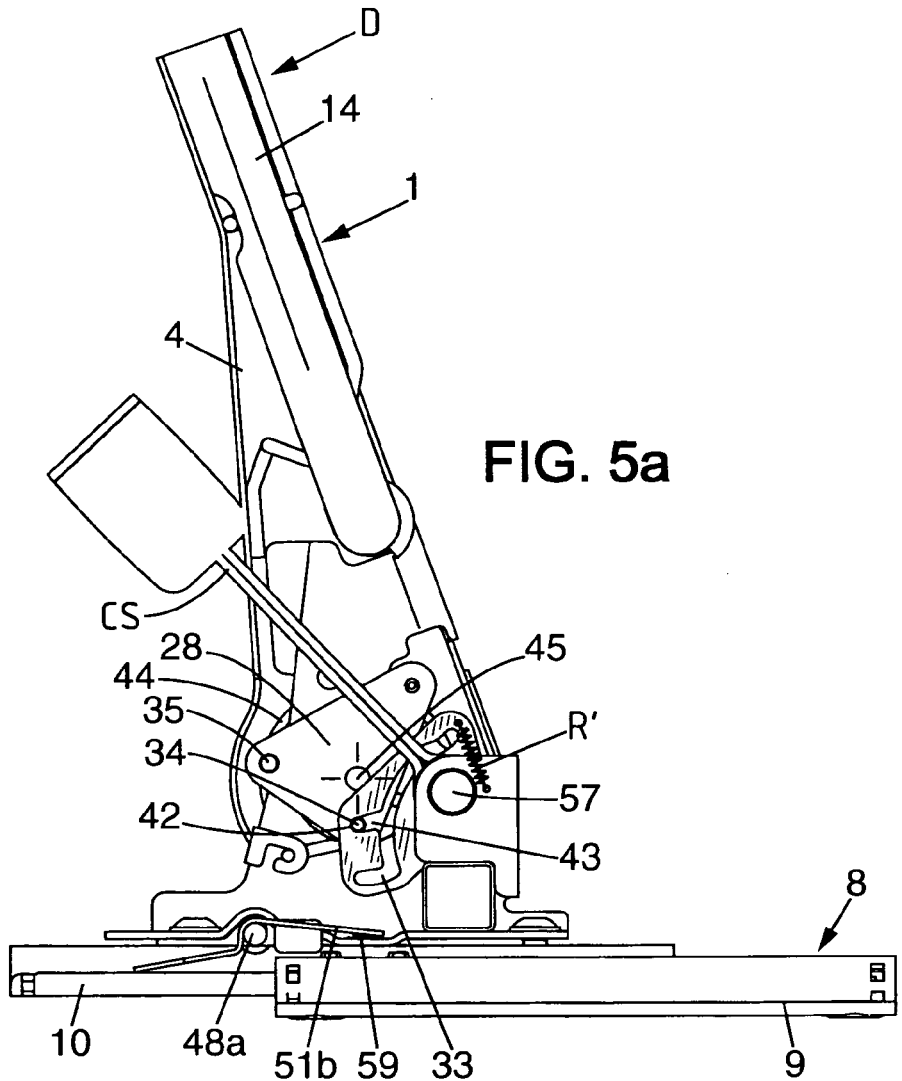
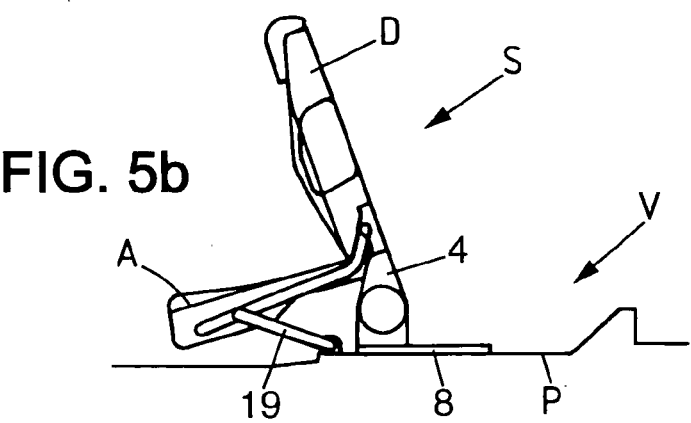

FOLD-DOWN SEAT AND A VEHICLE INCLUDING SUCH A SEAT

The present invention relates to fold-down seats and to vehicles including such seats.

More particularly, the invention relates to a vehicle seat comprising:

a runner made up of a fixed rail designed to be fixed to a vehicle floor, and of a moving rail mounted to slide relative to the fixed rail;

at least one front leg having a top end and a bottom end designed to be mounted to pivot relative to the vehicle floor;

a seat back mounted to pivot relative to the moving rail of the runner; and a seat proper having a front end mounted to pivot on the top end of the front leg.

BACKGROUND OF THE INVENTION

Document FR 2 575 708 describes an example of such a seat. The seat sliding along the runner makes it possible to define a normal in-use position, in which an occupant can sit in the seat, and a loading position, in which the seat is moved forwards and tilted, e.g. for loading objects behind the seat. In that position, the seat nevertheless still takes up a large amount of space, which prevents easy access to the space situated behind the seat, and prevents bulky objects from being stowed.

OBJECTS AND SUMMARY OF THE INVENTION

A particular object of the present invention is to mitigate that drawback.

To this end, the invention provides a vehicle seat wherein, in addition to having the above-mentioned characteristics, the seat back is mounted to pivot relative to the seat proper, and wherein the seat further comprises at least one locking device adapted to selectively preventing the seat back from pivoting or allowing said seat back to pivot (it being possible for the locking device to be mounted between the seat back and the runner, for example, or at any other pivot coupling between two component elements of the seat).

By means of these provisions, a user can gain space behind the seat by folding the seat back down partially or fully, while also having the possibility of adjusting the inclination of the seat back relative to the seat proper and the longitudinal position of the seat.

In preferred embodiments of the invention, it is optionally possible to use one or more of the following provisions:

the seat back is mounted to pivot relative to the moving rail of the runner via a hinge mechanism controlled by a control member for selectively either locking the seat back or enabling the seat back to pivot freely relative to the moving rail of the runner;

the seat further comprises a release device adapted so that the seat back pivoting forwards automatically unlocks the runner;

the seat back has an actuator provided with a cam edge that co-operates by means of a cam effect with an actuating lever mounted to pivot relative to the moving rail of the runner, said actuating lever being secured to an unlocking lever which is adapted to act on an unlocking finger belonging to the runner, so as to unlock said runner when the seat back pivots forwards into a position that is inclined by at least 10 degrees forwards;

the runner is organized to be unlocked when the seat back is in an intermediate tilt position, and a holding device is provided for preventing the seat back from pivoting forwards from its intermediate tilt position, when the moving rail is situated between a rear position and an intermediate slide position;

a pivot release device is adapted to allow the seat back to pivot forwards from its intermediate tilt position, when the moving rail reaches the intermediate slide position;

the seat further comprises a manual unlocking control organized so that it being actuated by a user unlocks the runner;

the seat back is adapted to pivot forwards into a folded-down position, in which said seat back extends substantially horizontally;

the bottom end of the front leg has an anchoring device adapted to selectively anchoring or releasing said bottom end relative to the vehicle floor, the seat being organized so that, after the front leg has been released by the anchoring device, the front end of the seat proper can be raised into a folded-up position in which the seat proper is held substantially vertical; and the seat further comprises a guide leg, a first end of which is mounted to pivot relative to the bottom end of the front leg, and a second end of which is mounted to pivot relative to the fixed rail of the runner.

In another aspect, the invention provides a vehicle having at least a floor and a seat, the bottom end of the front leg and the fixed rail of the runner being fixed to the floor.

In preferred embodiments of the invention, it is also optionally possible to use the following provision:

in the "folded-down" position of the seat, the seat is retracted into the floor of the vehicle.

BRIEF DESCRIPTION OF THE DRAWINGS

Other characteristics and advantages of the invention will appear on reading the following description of embodiments thereof, given by way of non-limiting example, and with reference to the accompanying drawings.

In the drawings:

FIG. 1 is a diagrammatic overall view of a seat in a first embodiment of the invention;

FIG. 2 is a perspective view of the structure of the seat of FIG. 1 in the normal in-use position;

FIGS. 5a and 5b are views respectively similar to FIGS. 3 and 1, when the seat back is folded down forwards partially to give access to the space behind the seat;

MORE DETAILED DESCRIPTION

Figure 3:
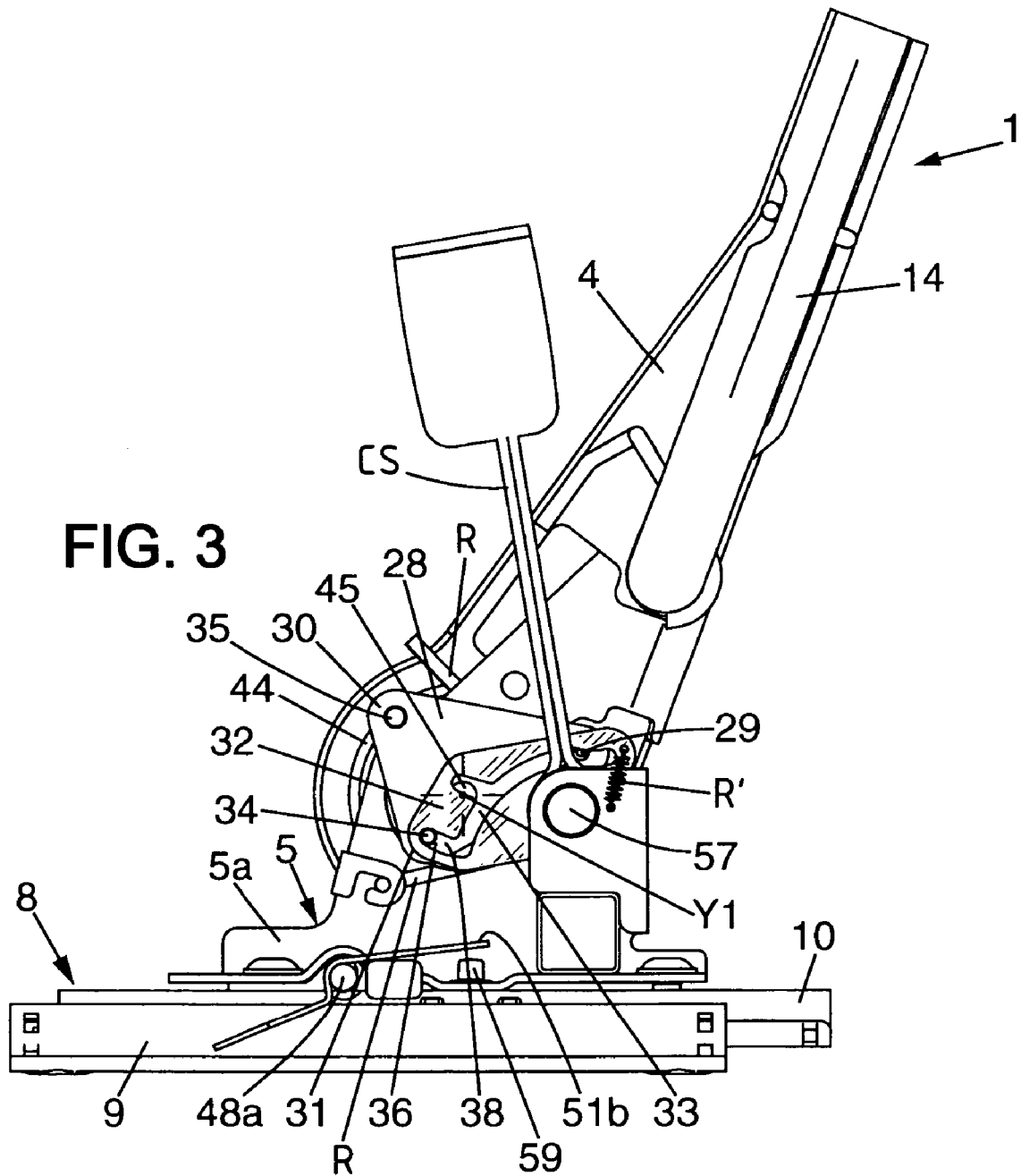
FIG. 3 is a detail view showing a portion of the right side of the seat structure of FIG. 2 in the normal in-use position, seen looking from inside the seat.

In the various figures, like references designate identical or similar elements.

FIG. 1 shows a first embodiment of a seat S of the invention. For example, the seat can belong to the row of seats situated directly behind the driver, or even to a row of seats situated further back in the vehicle. The seat can optionally be a passenger front seat, or even a driver's seat. In addition, the seat of the invention can seat either a single occupant, as shown in FIG. 1, or else more than one occupant, by then forming a bench seat.

The seat S comprises a seat back D and a seat proper A. The bottom end of the seat D is mounted to pivot about a transverse horizontal axis Y1, on respective moving rails 10 of two parallel runners 8, which moving rails are mounted to slide on fixed rails 9 secured to the floor P of the vehicle and making it possible for the position of the seat back to be adjusted by being moved along a longitudinal horizontal axis perpendicular to Y1 (only one runner 8 is shown in FIG. 1).

The rear end of the seat proper A is mounted to pivot on the seat back D about an axis Y2 parallel to Y1, while the font end of the seat proper A is mounted to pivot about an axis Y3 parallel to Y1, on respective ones of the top ends of two legs 19 (only one of the legs 19 is shown in FIG. 1). The bottom end of each leg 19 is mounted to pivot on the floor P of the vehicle, via at least one bearing 62.

FIG. 2 is a more detailed view of the structure of the seat of FIG. 1. The seat back D of the seat includes a seat back framework 1, e.g. made of metal and quadrilateral-shaped, which framework supports flexible padding (not shown), e.g. by means of seat back suspension webbing 2.

For example, the seat back framework 1 is made up of two side uprights 14 that are substantially vertical in the normal in-use position, and that are interconnected by a top cross-member 15 and by a bottom cross-member 16. These elements can optionally be integrated into a single tubular structure as shown in FIG. 2, or else form any other type of seat back framework.

Over all or some of its height, each side upright 14 of the seat back framework 1 can be fixed to a cheek plate 4 that is part of the framework of the seat back. The cheek plate 4 or the side upright 14 itself extends downwards to a bottom end which can, for example, have a rounded shape, and which is mounted to pivot about the axis Y1 on the moving rail 10 of the corresponding runner 8. It can be mounted directly on the moving rail 10 or on an intermediate support 5 itself fixed to the moving rail 10. A safety belt stem CS can be mounted to pivot on said support 5 about an axis 57 parallel to Y1.

Figure 4A:
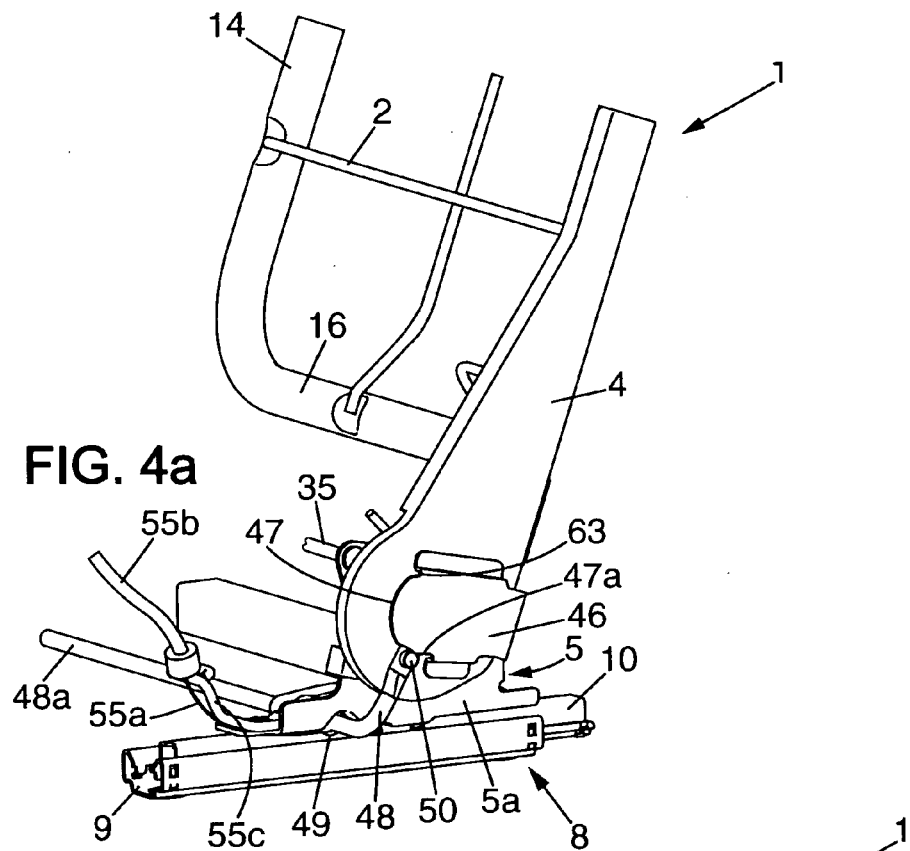
FIGS. 4a and 4b are perspective detail views showing a portion of the left side of the seat structure of FIG. 2, in the normal in-use position, seen respectively looking from outside the seat and from inside the seat.
Figure 4B:
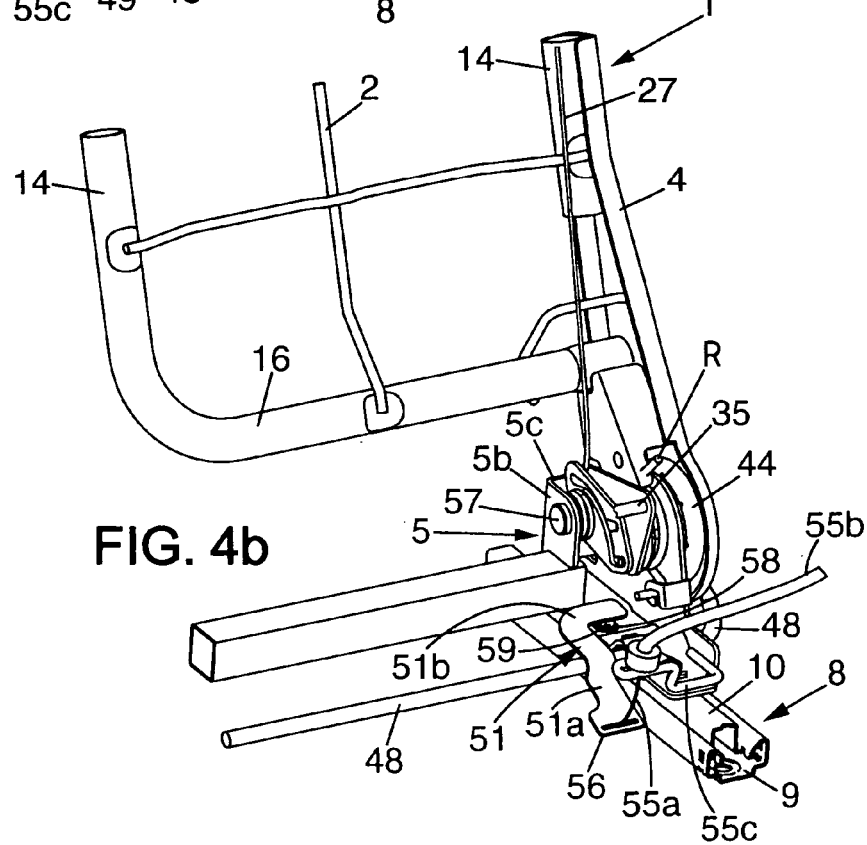

For example, the support 5 is a piece of sheet metal forming a yoke having two vertical flanges 5a, 5b parallel to the longitudinal axis and interconnected by a rear web 5c (see FIGS. 3 to 4b).

In a normal in-use position, each runner 8 is locked by an internal latch that is known per se, and that is urged resiliently towards its locked position, and the user can adjust the longitudinal position of the seat by manually actuating an unlocking control handle 55. The handle 55 is connected to an unlocking device which is described below, e.g. by means of a cable 55a mounted to slide in a sheath 55b, one end of which is fixed to a support 55c secured to the moving rail 10 of one of the runners 8.

In addition, the seat proper A has a seat proper framework 11, e.g. made of metal, and that is organized to carry a flexible padding (not shown) on which an occupant can sit, e.g. by means of seat proper suspension webbing 12. For example, the seat proper framework can comprise two substantially horizontal side arms 17 interconnected by a front cross-member 18. The seat proper framework may also be a sheet metal structure forming a bucket seat, or some other structure.

The seat proper framework 11 is mounted on the seat back framework 1 to pivot about the axis Y2, e.g. via two rear pivots 13, each of which connects the rear end of one of the side arms 17 to the corresponding cheek plate 4 or to the bottom portion of the corresponding side upright 14.

In addition, the front end of the seat proper framework is mounted to pivot at the top ends of the two above-mentioned front legs 19, e.g. by means of two pivots aligned along above-mentioned axis Y3.

For example, each front leg 19 can extend substantially vertically, when the seat is in the normal in-use position, between its top end 20 and a bottom end 21 that is mounted to pivot relative to the floor P of the vehicle.

Optionally, the front legs 19 can be interconnected at their bottom ends 21 by a bottom cross-member 22 parallel to the axis Y3. The bottom cross-member 22 can optionally be mounted in the above-mentioned bearing(s) 62. Naturally, other means can be used within the ambit of the invention for mounting the front legs 19 on the floor P.

FIGS. 3, 4a, and 4b show in detail the hinge whereby the framework 1 of the seat back is hinged to the runner, in a position corresponding to the seat being in the normal in-use position, i.e. when an occupant can sit in the seat.

For example, the coupling between the cheek plate 4 of the seat back and the support 5 mounted on the moving rail 10 of the runner 8 can, at least on one side of the seat, be implemented by means of a hinge mechanism 44 that is known per se, that is normally held locked, thereby locking the seat back D, and that is adapted to be unlocked, e.g. by turning a control shaft 45 that extends along the above-mentioned axis Y1, actuation of said shaft making it possible for the seat back D to pivot freely.

In addition, a return spring R is provided, e.g. connected to the support 5, and adapted to turn the seat back forwards to a position close to the vertical, once the hinge mechanism 44 has been unlocked.

In the example considered herein, two identical or similar hinge mechanisms 44 are provided, one on either side of the seat.

In addition, a guide 32, e.g. made from a thin sheet of metal that is triangular in overall shape, and that extends in a vertical plane parallel to the longitudinal direction, is mounted to pivot about the pivot axis 57 at least on one side of the seat (in the example shown, one guide 32 is provided on either side of the seat). The guide 32 is provided with a circularly arcuate slot 33 that is concave facing the axis 57, which slot communicates with two notches 38, 43 that extend substantially radially outwards, away from the axis 57. The guide is urged by a spring R' in the direction opposite from the direction in which the seat back is folded down forwards. For example, the spring R' is mounted between one end 40 of the slot and a point (not shown) in the vicinity of the axis 57. For example, the guide 32 may be driven by the safety belt stem CS, which makes it possible for the guide 32 to pivot only while the seat back is being folded down, but not while adjustment is being performed for the comfort of the occupant.

A control piece 28, e.g. that is triangular in shape, is fixed to the control shaft 45 of each hinge 44. For example, the control piece 28 has three corners 29, 30, and 31, the corner 31 carrying a peg 34 that penetrates into the slot 33 in the guide 32 and that is mounted to move in said slot. In the normal in-use position shown in FIGS. 1 to 4b, the peg 34 is situated at the end 36 of the notch 38.

On one of the sides of the seat back, a control handle 23 is mounted to pivot, e.g. on the side of the seat back, and said handle is connected to the corner 29 of the corresponding control piece 28, e.g. via a rod 27, so that by actuating the handle 23, it is possible to pivot the control piece 28 and the control shaft 45, thereby simultaneously unlocking the two hinge mechanisms 44 of the seat, whose respective control pieces 28 are secured together at their corners 30 via a coupling bar 35.

If the seat of the invention is a vehicle front seat, or a second-row seat of a vehicle having a third row, or, in other cases if necessary, the seat of the invention can also facilitate access to the space situated behind the seat.

Means are thus provided so that, by pivoting from its normal in-use position to a position inclined by about 10° to 20° forwards, the seat back causes the runner 8 to be unlocked.

For example, as shown in FIG. 4a, it is possible to make provision for an actuator 46 to be fixed to the outside face of at least one of the cheek plates 4, said actuator being in the form of a rigid vertical plate extending parallel to the longitudinal axis and having a cam edge 47a forming a projecting bulge 47.

The cam surface co-operates with an unlocking peg 50 formed at the free end of an actuating lever 48 which is mounted to pivot about a transverse horizontal pivot axis defined by a bearing 49 formed between the support 5 and the moving rail 10 of the runner 8. The actuating lever 48 is secured to an unlocking lever 51 having two lever arms 51a, 51b extending in diametrically opposite manner on either side of the pivot axis of the lever 48.

The first lever arm 51a is secured to one end of the above-mentioned cable 55a, while the second lever arm bears against an unlocking finger 59 that causes the corresponding runner 8 to be unlocked. For example, the unlocking finger 59 projects upwards from the moving rail 10 of said runner, and is resiliently urged upwards, e.g. by a resilient blade forming a latch situated inside the runner 8. By such means, the unlocking peg 50 remains in abutment against the cam edge 47a.

In addition, on the side opposite from the actuator 46, another unlocking lever 51 is advantageously provided that is identical or similar to the above-described lever 51 (this other unlocking lever has at least the second lever arm 51b), and that is in abutment against an unlocking finger 59 of the corresponding runner. The two unlocking levers 51 are preferably secured together by a coupling bar 48a so that the first actuating lever 48 being pivoted, either by the handle 55, or by the actuator 46, causes the other actuating lever 48 to be pivoted simultaneously, and thus causes both runners 8 to be unlocked.

The means described herein for unlocking the runners are however given merely by way of indication, and any other means for causing the runners to be unlocked when the seat back reaches a certain angle of inclination can be considered within the ambit of the invention.

The above-described seat operates as follows.

In the normal in-use position shown in FIGS. 1 to 4b, a user can adjust:

the overall longitudinal position of the seat S, by acting on the handle 55, thereby unlocking both of the runners 8, and making it possible to move the seat back forwards or backwards: given the substantially vertical position of the front legs 19 in the normal in-use position, this movement also results in the seat proper being moved substantially horizontally over a substantially identical distance; and the inclination of the seat back for the comfort of the occupant, by actuating the handle 23, the seat back D pivoting forwards under drive from at least one spring R or backwards against the drive from said spring R. It is optionally possible to dispose an abutment (not shown) limiting the extent to which the seat back can pivot backwards. In addition, the seat back pivoting is accompanied by the seat proper moving substantially horizontally.

The back D of the seat may also be folded down forwards from its normal in-use position shown in FIGS. 1 to 4b to the above-mentioned inclined position shown in FIGS. 5a and 5b, in which said seat back makes it easier to access a space situated behind the seat S.

For this purpose, the user unlocks the hinge mechanisms 44 by actuating the handle 23. Action by the user on the control handle 23 causes the control piece 28 to pivot, and thus causes the shaft 45 of the hinge mechanisms to turn, thereby unlocking them.

When the hinge mechanisms 44 are unlocked, the seat back D pivots forwards under drive from the spring R and/or under drive from the user. Simultaneously, the peg 34 turns about the shaft 45 and the guide 32 turns about the axis 57. The peg 34 moves inside the slot 33 in the guide 32 until it reaches the second notch 43 in said slot.

If the user has released the handle 23 when the peg 34 goes past said notch 43, said peg engages in said notch, so that the control pieces 28 can return to their rest positions with the control shafts 45 of the hinge mechanisms 44 which can thus be locked again.

In addition, when the seat back D is in this position, the bulge 47 on the actuator 46 bears against the unlocking peg 50 and causes the actuating lever 48 to turn with the two unlocking levers 51, so as to unlock the two runners 8. The user can thus slide the seat forwards, so as to make it easier to access the space situated behind the seat of the invention.

Figure 6A:
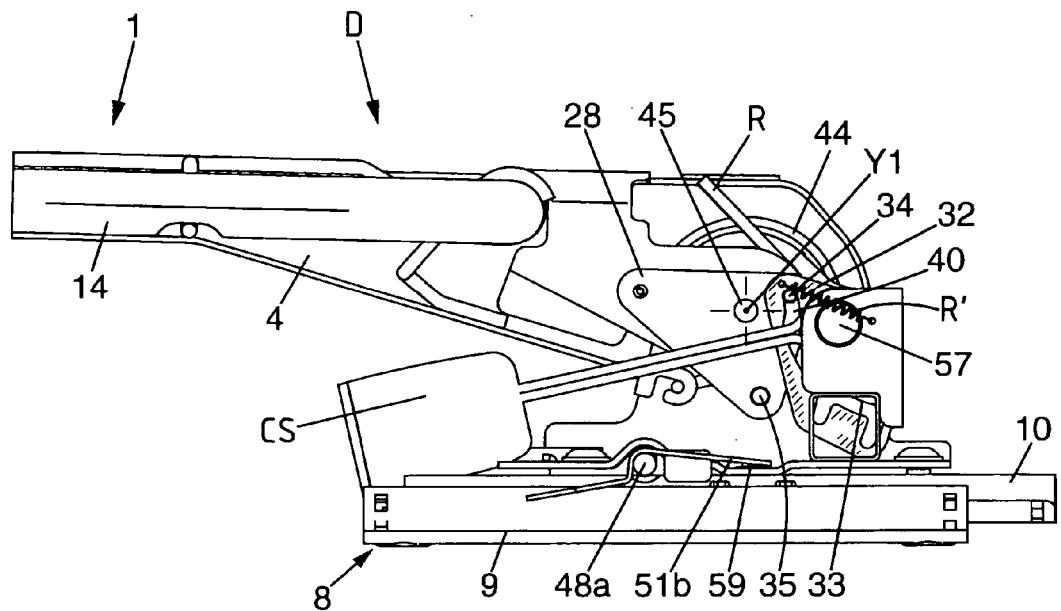
FIGS. 6a and 6b are side views showing a seat of the invention with its back in the fully folded-down forwards position.
Figure 6B:
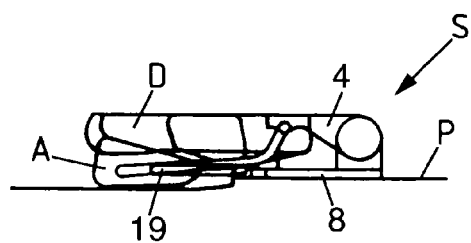

If the user wishes to fold the seat back D down fully until it is horizontal, as shown in FIGS. 6a and 6b, the user continues to actuate the handle 23 when the seat back goes into the above-mentioned inclined position, i.e. when the peg goes past the notch 43. The seat back can then continue to pivot until it reaches the folded-down position, and, during this movement, the peg 34 follows the slot 33 in the guide 32 while the control piece 28 continues to turn counterclockwise, until the peg 34 reaches the top end 40 of the slot 33.

The back D of the seat is then folded down onto the seat proper, as shown in FIG. 6b. At this stage, the seat folded down in this way can be completely retracted into the floor of the vehicle, which makes it possible to increase the possibilities for loading objects into the trunk of the vehicle.

When the user then releases the handle, the hinge mechanisms 44 can optionally lock again in this folded-down position.

Advantageously, provision can be made so that, once the seat has been folded down, the peg 50 has traveled over the entire bulge 47, and the lever 48 can pivot in the reverse direction, making it possible to re-lock the runner in this position. The peg 50 then comes to be received in a recess 63 in the actuator (FIG. 4a).

Starting from the normal in-use position, a user can thus, by means of a single action, either bring the seat into the inclined position, or else bring the seat into the folded-down position.

In order to put the seat back into its in-use position starting from the inclined position shown in FIGS. 5a and 5b, or starting from the folded-down position shown in FIGS. 6a, 6b, the user just has to perform the movements that are the reverse of the movements described above.

Figure 7A:
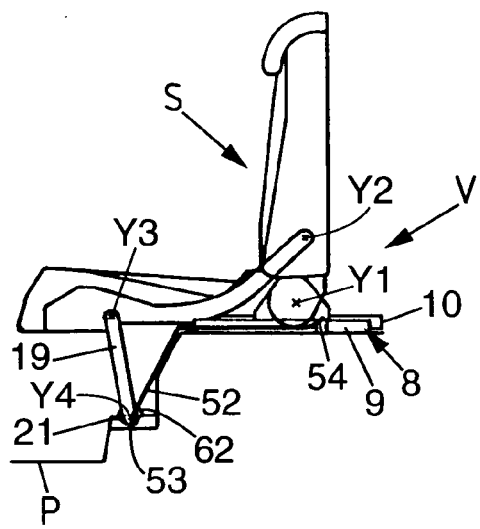
FIGS. 7a to 7c are diagrammatic views of a seat in a second embodiment of the invention, in three positions.
Figure 7B:
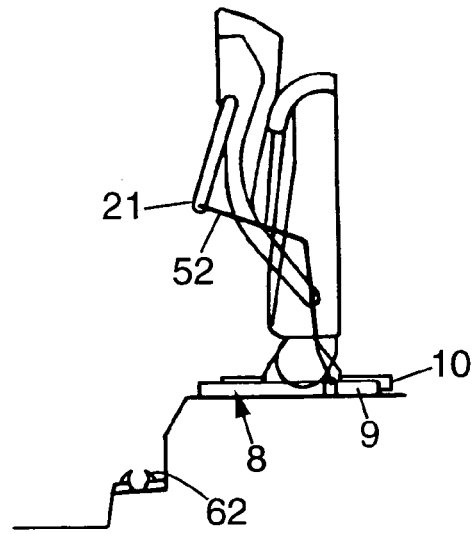
Figure 7C:
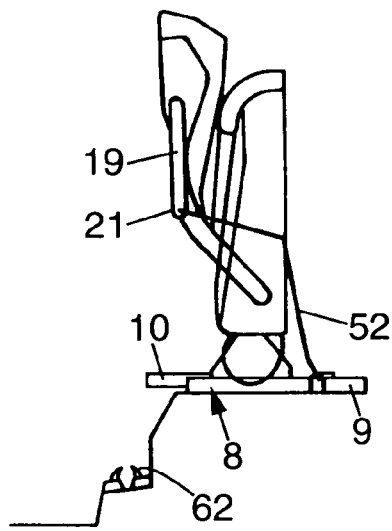

FIGS. 7a to 7c show a second embodiment of the seat of the invention, which embodiment is similar to the above-described first embodiment and is thus not described again below. In this second embodiment, the seat can also easily be brought into a folded-up position in which the seat proper is raised to a substantially vertical position against the seat back, thereby making it possible to stow tall or bulky objects in the space in front of the seat.

To this end, in the second embodiment, the bottom bearing 62 of the front legs is adapted to release said legs when it is actuated by the user, or else the bottom ends of said legs can be provided with releasable anchoring devices such as those commonly used for the legs of removable seats. For example, anchoring of the spring clip type can be provided, having two arcuate lips, e.g. made of plastic, retaining the bottom cross-member 22, and suitable for parting to allow said cross-member to pass through them when said cross-member is moved upwards by a user.

Any other type of anchoring, e.g. of the snap-hook type, can also be considered.

In addition, the seat is provided with at least one guide leg 52 having a first end 53 mounted to pivot on the bottom end 21 of the front leg 19, and a second end 54 mounted to rotate on the fixed rail 9 or on a portion of the floor P of the vehicle.

Thus, starting from the normal in-use position shown in FIG. 7a, when the user releases the bottom ends of the front legs 19, said user can cause the seat proper to pivot in the direction in which its front end is raised, e.g. under drive from resilient means (not shown) until it reaches the folded-up position shown in FIG. 7b, in which the seat is brought almost vertically into contact with the back of the seat.

The seat proper can be held in this folded-up position by a self-adhesive strip, by a strap, or by some other conventional retaining means.

The guide leg 52 serves to position the bottom end 21 of the front leg so that, regardless of the position of the seat along the runner 8, and even if said position is changed while the seat proper is folded up as shown in FIG. 7c, the bottom end 21 of the front leg is guided so as to engage directly into its bearing 62 when the seat proper is brought back to the horizontal.

In order to adapt to certain vehicles it can be advantageous to allow the seat back to tilt partially or fully forwards about the axis Y1 only when the seat back is in or beyond a longitudinal position that is relatively far forwards along the runners. It is then possible to make provision for the runners to be unlocked only when the seat back is in an intermediate tilt position situated between the normal in-use position and the inclined position, in which intermediate tilt position the seat back is, for example, held substantially vertical. The seat back can slide forwards along the runner until it reaches an intermediate slide position in which the seat back is allowed to tilt forwards until it reaches its inclined position or its folded-down position.

Figure 8A:
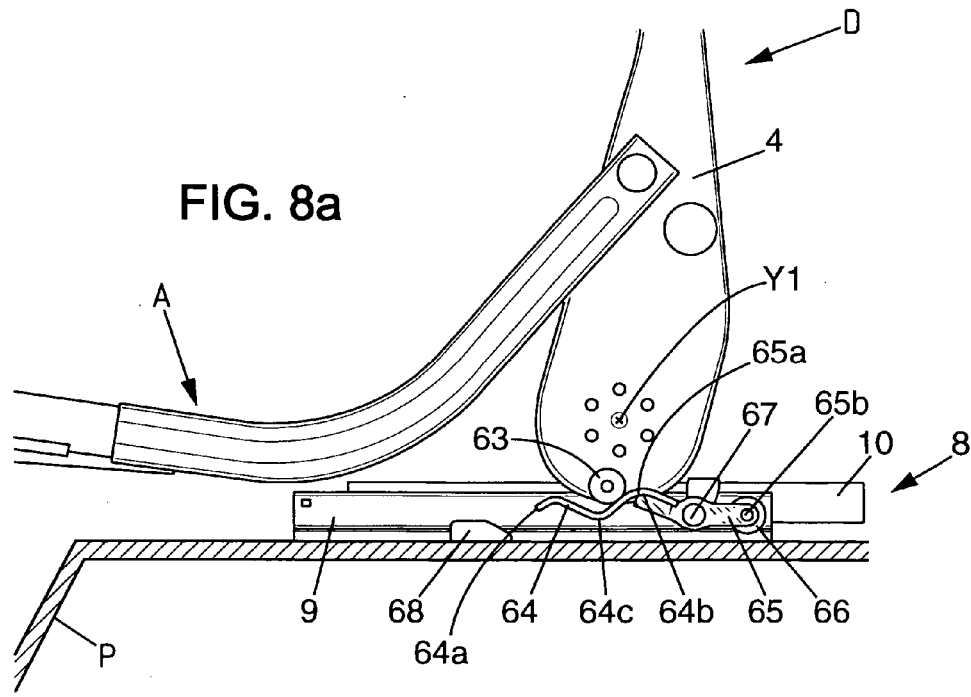
FIGS. 8a and 8b show a variant of the invention.
Figure 8B:
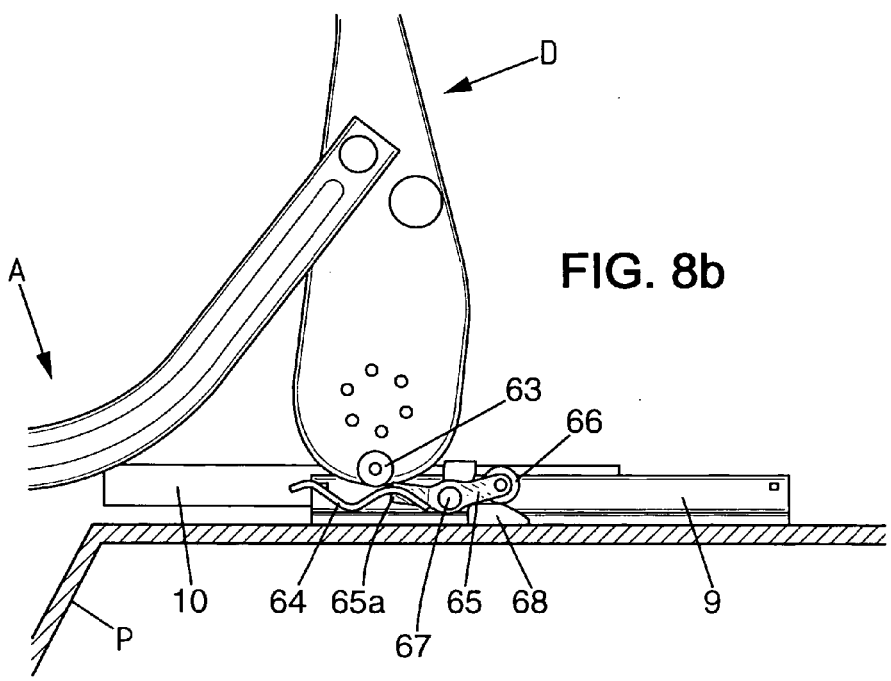

In this case, it is possible to provide a variant of the above-mentioned device for releasing the runners, as shown in FIGS. 8a and 8b. In this variant, the actuator 46 and the actuating peg 50 are omitted. At its bottom end, the cheek plate 4 of the seat back D has an actuating peg 63. When the seat is in the normal in-use position, as shown in FIG. 8a, the actuating peg 63 is situated in the vicinity of an actuating piece 64. The actuating piece 64 is connected at its front end 64a to the unlocking control 55, and it can have an S-shaped profile, with a crest 64b at its rear end, and a trough 64c lying between the front end 64a and the crest 64b, in the vicinity of which trough the actuating peg 63 is situated when the seat is in the normal in-use position.

The moving rail 10 of the runner 8 is further provided with an elongate tab 65 extending, for example, along the runner, and parallel to the longitudinal axis behind the cheek plate 4 of the seat back D, e.g. in a plane lying between the plane of the actuating piece 64 and the cheek plate 4. The tab 65 has a front end 65a and a rear end 65b on which a wheel 66 is mounted. Between the two ends, the tab 65 is, for example, mounted to pivot about a pin 67 connected in fixed manner to the moving rail 10 of the runner 8.

A projection 68 is also provided that is mounted to be fixed relative to the fixed rail 9 of the runner, e.g. directly on the rail, or on the floor P of the vehicle, in front of the seat back D in its normal in-use position. Said projection is present at least in the longitudinal plane of the wheel 66.

The user acting on the control handle 23 for the purpose of bringing the seat back D at least into its inclined position, causes the seat back D to pivot relative to the axis $Y_1$, thereby resulting in the actuating peg 63 moving mainly rearwards until said actuating peg 63 comes into abutment against the front end 65a of the tab 65, thereby preventing the seat back D from pivoting forwards. In this position, the actuating peg 63 can come into contact with the crest 64b of the actuating piece 64, and can cause said actuating piece 64 to move mainly downwards, thereby unlocking the runner, while the seat back D is in an intermediate tilt position close to the vertical.

Since the runner is unlocked, the user can cause the seat back to slide mainly forwards without the angle that the seat back forms with the vertical being modified, until the wheel 66 reaches the projection 68 connected to the fixed rail 9 of the runner 8, as shown in FIG. 8b. The wheel 6 rises as it rolls over the projection 68, thereby causing the tab 65 to pivot about its pin 67, which causes the front end 65a of said tab to move mainly downwards, thereby releasing the actuating peg 63. The seat back D is then free to be tilted forwards, e.g. until it reaches the inclined position or the folded-down position. In addition, the piece 64 is urged resiliently upwards, and the actuating peg 63 being disengaged releases the actuating piece 64, which can then move mainly upwards, which causes the runner to be re-locked in this position.

Such a mechanism thus makes it possible to allow he seat back to tilt forwards only once said seat back has reached a given intermediate longitudinal slide position relative to the fixed rail 9 of the runner, and thus relative to the floor of the vehicle, which makes it possible to adapt the seat of the invention, e.g. to the type of floor P used in a given vehicle.

What is claimed is:

1. A vehicle having at least a floor and a vehicle seat comprising:
    a runner made up of a fixed rail fixed to the vehicle floor, and of a moving rail mounted to slide relative to the fixed rail;
    at least one front leg having a top end and a bottom end directly mounted on the vehicle floor to be able to pivot relative to the vehicle floor;
    a seat back mounted to pivot relative to the moving rail of the runner; and
    a seat proper having a front end mounted to pivot on the top end of the front leg;
    wherein the seat back is mounted on the seat proper to pivot relative to the seat proper; and
    wherein the seat further comprises at least one locking device adapted to selectively prevent the seat back from pivoting or allow said seat back to pivot.

2. A vehicle according to claim 1, in which the seat back is mounted to pivot relative to the moving rail of the runner via a hinge mechanism controlled by a control member for selectively either locking the seat back or enabling the seat back to pivot freely relative to the moving rail of the runner.

3. A vehicle according to claim 1, wherein the vehicle seat further comprises a release device adapted so that the seat back pivoting forwards automatically unlocks the runner.

4. A vehicle according to claim 3, in which the seat back has an actuator provided with a cam edge that co-operates by means of a cam effect with an actuating lever mounted to pivot relative to the moving rail of the runner, said actuating lever being secured to an unlocking lever which is adapted to act on an unlocking finger belonging to the runner, so as to unlock said runner when the seat back pivots forwards into a position that is inclined by at least 10 degrees forwards.

5. A vehicle according to claim 3, in which the runner is organized to be unlocked when the seat back is in an intermediate tilt position, and in which a holding device is provided for preventing the seat back from pivoting forwards from the intermediate tilt position, when the moving rail is situated between a rear position and an intermediate slide position.

6. A vehicle according to claim 5, in which a pivot release device is adapted to allow the seat back to pivot forwards from its intermediate tilt position, when the moving rail reaches the intermediate slide position.

7. A vehicle according to claim 3, wherein the vehicle seat further comprises a manual unlocking control organized so that an actuation of said manual unlocking control by a user unlocks the runner.

8. A vehicle according to claim 1, in which the seat back is adapted to pivot forwards into a folded-down position, in which said seat back extends substantially horizontally.

9. A vehicle according to claim 8, in which, in the folded-down position of the seat, the seat is retracted into the floor of the vehicle.

10. A vehicle according to claim 1, in which the bottom end of the front leg has an anchoring device adapted to selectively anchor or release said bottom end relative to the vehicle floor, the seat being organized so that, after the front leg has been released by its anchoring device, the front end of the seat proper can be raised into a folded-up position in which the seat proper is held substantially vertical.

11. A vehicle according to claim 10, further comprising a guide leg, a first end of which is mounted to pivot relative to the bottom end of the front leg, and a second end of which is mounted to pivot relative to the fixed rail of the runner.

12. A vehicle according to claim 1, wherein the seat back is mounted to pivot relative to the moving rail of the runner about a first axis, and wherein the seat back is mounted to pivot relative to the seat proper about a second axis, said second axis being different from said first axis.

13. A vehicle according to claim 1, wherein the seat back is mounted to pivot relative to the seat proper at least between a normal in-use position and a comfort position.

14. A vehicle seat according to claim 1, wherein the seat back is mounted to pivot relative to the seat proper at least between a normal in-use position and an inclined forward position.

* * * * *